United States Patent

[11] 3,616,363

| [72] | Inventor | Alwin S. Milian, Jr.<br>Lancaster Village, Wilmington, Del. |
|---|---|---|
| [21] | Appl. No. | 729,888 |
| [22] | Filed | May 17, 1968 |
| [45] | Patented | Oct. 26, 1971 |
| [73] | Assignee | E. I. du Pont de Nemours and Company<br>Wilmington, Del. |

[54] PHOTOLYTIC CROSS-LINKING OF OLEFINIC HYDROCARBON CONTAINING CARBOXYLIC ACID COPOLYMERS
2 Claims, No Drawings

[52] U.S. Cl. .................................................. 204/159.14,
204/159.15, 204/159.17, 260/78.4 D, 260/88.1
PC, 260/94.9 GD, 260/897 A, 260/897 B
[51] Int. Cl. ............................................... B01j 1/00,
C08d 1/00
[50] Field of Search ......................................... 260/88.1;
204/159.17, 159.14

[56] References Cited
UNITED STATES PATENTS

| 3,480,580 | 11/1969 | Joyner et al. | 204/159.17 |
| 3,014,799 | 12/1961 | Oster | 204/159.2 |
| 3,503,824 | 3/1970 | Nelson | 260/88.1 |

FOREIGN PATENTS

| 655,298 | 1/1963 | Canada |
| 1,087,286 | 10/1967 | Great Britain |

Primary Examiner—John C. Bleutge
Assistant Examiner—Richard B. Turer
Attorney—Earl L. Handley ABSTRACT: Cross-linking olefinic hydrocarbon containing carboxylic acid polymers by use of ultraviolet light of a wavelength of less than 2,900 A. The carboxylic acid may be present as units in the olefinic polymer, or as free unpolymerized carboxylic acid, or as polymerized units blended with the olefinic polymer. The copolymer may be partially neutralized, but must contain at least 0.5 mole percent unneutralized acid.

PHOTOLYTIC CROSS-LINKING OF OLEFINIC HYDROCARBON CONTAINING CARBOXYLIC ACID COPOLYMERS

This invention relates to a process of cross-linking polymers.

It is known in the art to cross-link polymers by addition of free radical producing substances such as peroxides. It is also known to cross-link polymers by addition of a cross-linking agent such as sulfur to an unsaturated polymer. It is further known to cross-link polymers by irradiating them with X-rays, gamma rays, etc. The present process is concerned with cross-linking using irradiation, and more specifically, using ultraviolet irradiation having a wavelength of less than 2,900 A.

The present invention is concerned with, cross-linking olefinic polymers; such polymers may be homopolymers or copolymers. Examples of such polymers are polyethylene, polypropylene, polybutene, polypentene and the like as well as copolymers of these monomers, and copolymers of these monomers with alpha-beta ethylenically unsaturated carboxylic acids of three to eight carbon atoms. In order to cross-link such polymers using ultraviolet light, it is necessary that the reaction mass contain at least 0.5 percent carboxylic acid in an unneutralized form. This acid may be present in the form of polymerized units in the olefinic polymer chains, or in some of the olefinic polymer chains, or as an acid homopolymer blended with the olefinic polymer, or as an unpolymerized carboxylic acid. The preferred class of starting materials are random olefinic copolymers of the acid in which the olefin is present to the extent of at least 50 mole percent of the units polymerized, such as those disclosed in U.S. Pat. No. 3,264,272. The preferred species is the random copolymer of ethylene and methacrylic acid. The acid constituent of the copolymer may be partially neutralized by techniques known in the art — see U.S. Pat. No. 3,264,272 — but it is essential that at least 0.5 mole percent of the molecules used to form the copolymer be unneutralized acid groups. Neutralization of a portion of the acid groups seems to decrease the rate at which cross-linking using irradiation occurs. The acids used may be monocarboxylic or dicarboxylic.

The copolymers are preferably prepared using a stirred autoclave and a constant environment. Such a process is disclosed in Canadian Pat. No. 655,298, issued Jan. 1, 1963. Polymers prepared by such a process are uniformly random.

Ultraviolet light of a wavelength of less than 2,900 A causes the acid to decarboxylate. Carbon dioxide, carbon monoxide and water are formed. The resulting cross-link is apparently a carbon-carbon link between what originally were separate polymer molecules. The ultraviolet light source will also contain rays of other wavelength, but this radiation does not affect the copolymer in such a way as to cross-link it. Since it is the carboxyl group itself that breaks up during reaction, such photosensitizers as benzophenone are not needed, and, in fact, are detrimental to the reaction speed.

The degree of cross-linking obtained is dependent on the intensity of the radiation below 2,900 A and upon the time. The intensity can vary over a wide range and still be effective. If the copolymer is cooled by immersion in water in a quartz container greater than $200 \times 10^{16}$ photons/cm.$^2$-sec. may be applied. It is, of course, desirable to have as many photons as possible come from the ultraviolet light of a wavelength of less than 2,900 A, so that the reaction will be efficiently practiced.

The amount of treatment that is carried out depends on the properties desired in the final product. One method of measuring the degree of cross-linking is to measure the difference in polymer flow properties, for example, melt index. Seldom would one employ the ultraviolet treatment process of the present invention to cross-link a polymer to an extent less than a factor of 5 in melt index, although in some circumstances even a minor degree of cross-linking may be beneficial.

Since the polymer is preferably free of photosensitizers, the ultraviolet radiation penetrates to a substantial depth, and causes cross-linking to a substantial degree even at a depth of one-tenth of an inch. Thus, samples two-tenths of an inch thick may be cross-linked through by irradiation from both sides.

The irradiation may take place in air, oxygen, or a relatively inert atmosphere, such as nitrogen, or even at reduced pressure in the substantial absence of any gas. Changes in the atmosphere around the polymer being irradiated only slightly change the results. The temperature of the polymer during irradiation likewise is not critical and may vary from less than room temperature up to and including the crystalline melting point of the polymer without substantially changing the results.

Polyolefin resin cross-linked by the process of the present invention, when heated and stretched and then cooled in the stretched condition will tend to return to its original cross-linked dimensions when reheated. Thus, the process is useful to produce resins of increased toughness and durability but also heat-shrinkable tubes, cable jackets, electrical connector insulators and the like. The tendency of the stretched resin to return to its original dimensions is related to the degree of cross-linking, i.e., the tendency is greater in highly cross-linked products.

In the following examples which illustrate the invention, all parts and percentages are in parts by weight unless otherwise specified.

EXAMPLE I

A sample of a random copolymer of ethylene and methacrylic acid, containing 12 weight percent methacrylic acid which was neutralized to about 20 mole percent with zinc ions, in accordance with the teachings of U.S. Pat. No. 3,264,272, was pressed into a molding 3 ×6 ×0.18 in. at 145° C. and 35,000 lb./in.$^2$ The molding was placed in a Rayonet photochemical reactor with 16 Rayonet lamps No. R.P.R.-2,537 9¼-in. length, arranged in the shape of a cylinder 9 in. in diameter. The reactor had a cylindrical reflector approximately 10 in. in diameter outside the cylinder of lamps and a fan for air circulation. According to the manufacturer, the radiation intensity in the center of the reactor is 13 milliwatts/cm.$^2$ at 2,537 A when the temperature in the reactor is 44° C. and the lamps are new. The fan was on and the temperature in the reactor was about 37° C. The molding was treated for 2.00 hours in the reactor and while being treated it was rotated at 5 r.p.m. A ½-in. wide strip of the molding was then heated in a Bunsen burner until the strip was hot enough to become completely free of cloudiness. It was then stretched until its length had increased five times, and then quenched in cold water. Upon reheating in the Bunsen burner the sample returned to its original dimensions.

EXAMPLE II

A 10 mil thick film of the copolymer of example I melt index 1.114 g./10 min. with a 2,160 g. load was cut into 20 rectangular pieces 3 ×3 in. The 20 layers were stacked one on top of the other and pressed together in a Preco platen press at 7,500 p.s.i. ram pressure and 73° C. for about 5 min. The resultant block of polymer contained essentially no air spaces. The sample was then irradiated in the reactor described in Example I for 30 min. The sample was mounted in the center of the reactor and rotated slowly at approximately 5 r.p.m. The melt flows of the various layers were measured according to ASTM method D–1238–62T as revised in 1957, 1962 at 190° C. The experiment was repeated except that the irradiation time was extended to 2.00 hrs. The results were as follows:

DEGREE OF CROSS-LINKING

MEASURED BY MELT FLOW AT 190° C.

| 30 Minute Exposure | 2.00 Hour Exposure |
| --- | --- |

| Layer | Flow in g./10 min. with a 2160 g. load | Flow in g./10 min. with a 6480 g. load | Flow in g./10 min. with a 2160 g. load | Flow in g./10 min. with a 6480 g. load |
|---|---|---|---|---|
| 1 | 0.0002 | 0.031 | 0.0016 | 0.0140 |
| 2 | 0.0001 | 0.0180 | 0.0001 | 0.0021 |
| 3 | 0.525 | 2.60 | 0.0001 | 0.0105 |
| 4 | 0.825 | 3.80 | 0.0015 | 0.0194 |
| 5 | 0.55 | 2.78 | 0.0034 | 0.0607 |
| 6 | 0.87 | 4.20 | 0.0059 | 0.1255 |
| 7 | 0.57 | 3.32 | 0.0079 | 0.1467 |
| 8 | 0.62 | 3.10 | 0.0242 | 0.3149 |
| 9 | 0.91 | 3.94 | 0.0140 | 0.3138 |
| 10 | 0.85 | 3.92 | 0.0171 | 0.210 |
| 11 | 1.20 | 4.16 | 0.0213 | 0.348 |
| 12 | 0.82 | 3.04 | | |
| 13 | 1.36 | 5.56 | | |
| 14 | 0.79 | 3.28 | | |
| 15 | 0.575 | 2.88 | | |
| 16 | 0.91 | 4.54 | 0.0034 | 0.0591 |
| 17 | 0.58 | 3.36 | 0.0013 | 0.0113 |
| 18 | 0.13 | 0.76 | 0.0003 | 0.0260 |
| 19 | 0.0001 | 0.096 | 0.0001 | 0.0076 |
| 20 | 0.0001 | 0.043 | 0.0011 | 0.0260 |

EXAMPLE III

The process of example I may be repeated with similar results using an unneutralized random copolymer of ethylene and acrylic acid containing about 10 weight percent acrylic acid, having a melt index of about 80.

EXAMPLE IV

The process of example I may be repeated using a blend of about 5 percent by weight low molecular weight polymethacrylic acid and polypropylene, melt index of about 4, with similar results.

EXAMPLE V 495 grams of a commercial branched polyethylene was milled with 5.0 g. of glutaric acid at 130° C. for 20 minutes. A 3×6×0.175 in. plaque was molded and exposed to ultraviolet light in the reactor described in example I for 30 minutes. The melt flow with a load of 2,160 g. before irradiation was measured as 3.016 g./10 min. and after irradiation, as 0.700 g./10 min.

EXAMPLE VI

An ethylene/methacrylic acid copolymer containing 12 percent by weight acid was pressed into a plaque 3×6×0.175 in. and subjected to irradiation in the reactor described in example I for 30 minutes. The melt flow of the polymer prior to irradiation was 10.03 g./10 min. at a load of 2,160 g. and 0.11 g./10 min. after irradiation at the same load.

I claim:

1. A process of cross-linking an olefin copolymer selected from the class consisting of copolymers containing at least 50 mole percent polymerized ethylene units and at least 0.5 mole percent polymerized alpha, beta ethylenically unsaturated carboxylic acid units of three to eight carbon atoms, and such copolymers in which a portion of the acid groups are neutralized with metallic ions but at least 0.5 mole percent of the acid groups are unneutralized, which comprises irradiating said olefinic copolymer with ultraviolet light having a wavelength of less than 2,900 A, whereby the melt index of the polymer is decreased.

2. The process of claim 1 in which the olefin copolymer is subjected to a cooling environment during irradiation.

* * * * *